(No Model.) 3 Sheets—Sheet 1.
E. S. BENHAM.
SEED PLANTING MACHINE.
No. 564,550. Patented July 21, 1896.
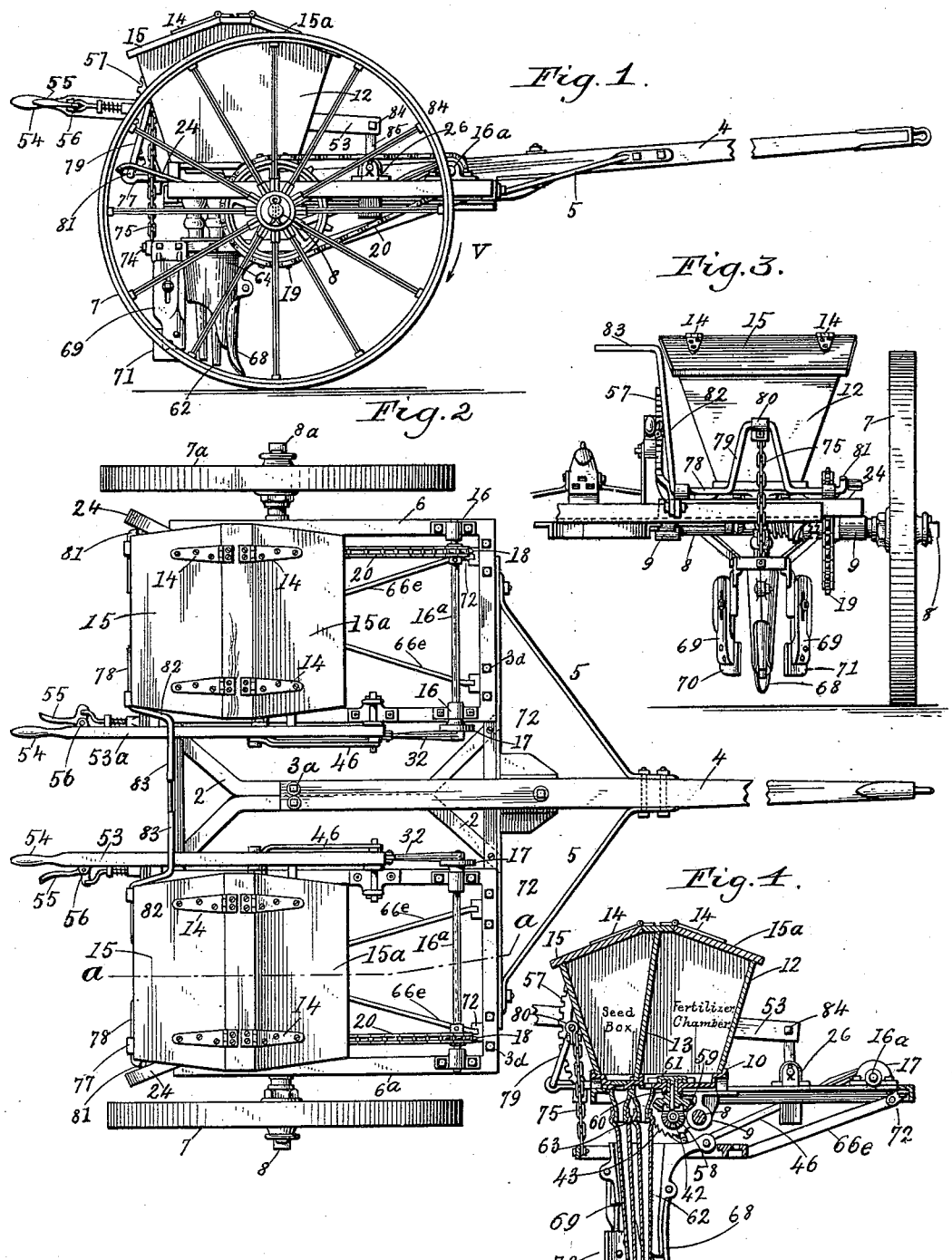
Witnesses,
Emil Neuhart
A. J. Sangster
Inventor.
Ethan S. Benham
By James Sangster, Attorney.

(No Model.) 3 Sheets—Sheet 2.
E. S. BENHAM.
SEED PLANTING MACHINE.
No. 564,550. Patented July 21, 1896.
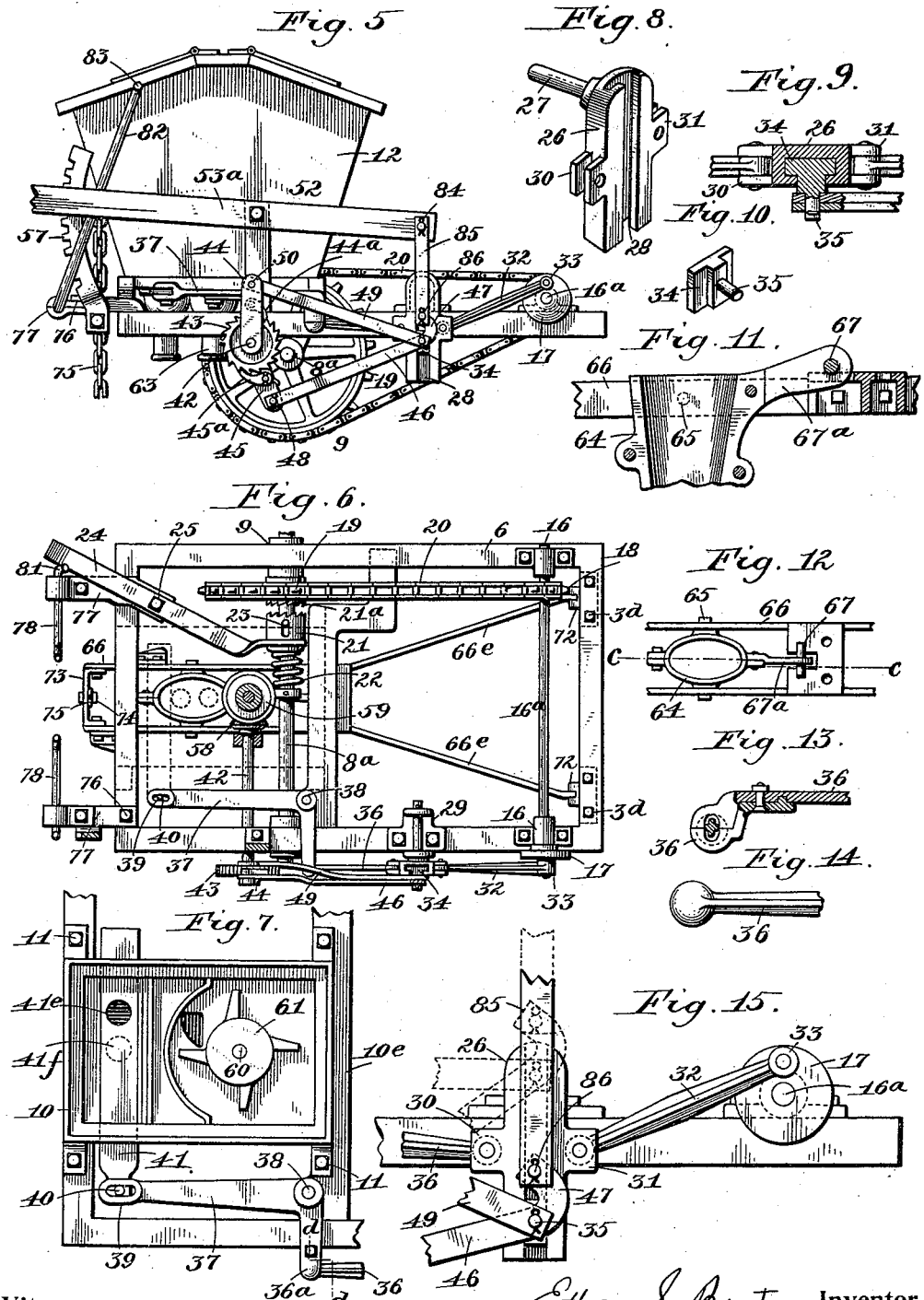
Witnesses,
Emil Neuhart.
L. M. Spong.
Ethan S. Benham Inventor.
By James Sangster Attorney.

(No Model.)  3 Sheets—Sheet 3.
E. S. BENHAM.
SEED PLANTING MACHINE.
No. 564,550. Patented July 21, 1896.
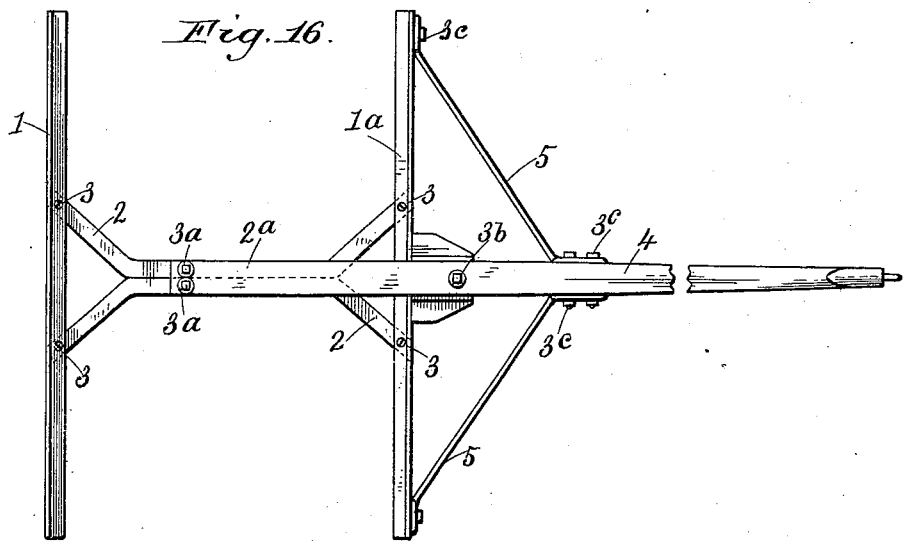
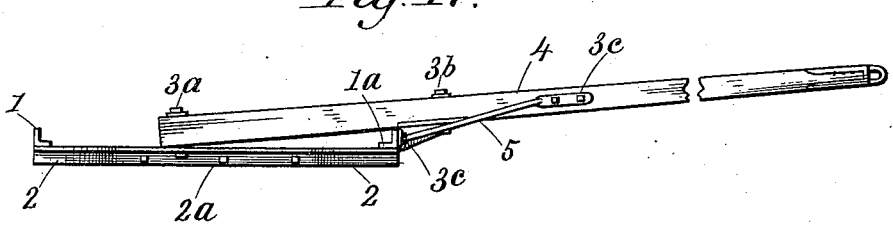
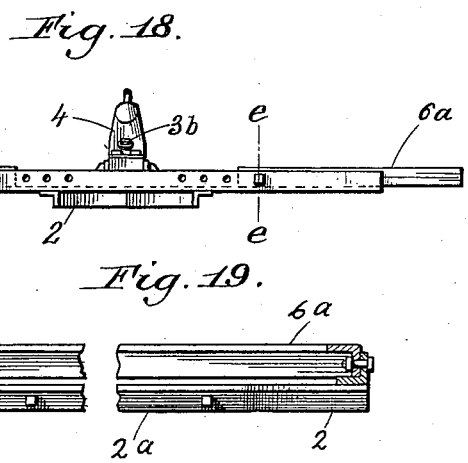
Witnesses,  Ethan S. Benham Inventor.
Emil Newhart.
A. J. Sangster.  By James Sangster, Attorney.

UNITED STATES PATENT OFFICE.

ETHAN S. BENHAM, OF WARSAW, NEW YORK, ASSIGNOR TO THE VARIETY MACHINE COMPANY, OF SAME PLACE.

SEED-PLANTING MACHINE.

SPECIFICATION forming part of Letters Patent No. 564,550, dated July 21, 1896.

Application filed February 29, 1896. Serial No. 581,264. (No model.)

*To all whom it may concern:*

Be it known that I, ETHAN S. BENHAM, a citizen of the United States, residing at Warsaw, in the county of Wyoming and State of New York, have invented certain new and useful Improvements in Seed-Planting Machines, of which the following is a specification.

My invention relates to certain improvements whereby the machine is simplified in its construction and is rendered certain and efficient in its action, and by which it is adapted for planting corn or other cereals, as well as beans, and also in combining therewith a fertilizer-distributing mechanism.

My invention further consists in certain details of construction, all of which will be fully and clearly hereinafter described and claimed, reference being had to the accompanying drawings, in which—

Figure 1 represents a side elevation of the machine complete. Fig. 2 is a top plan view of the same. Fig. 3 is a rear view of substantially one-half of the machine. Fig. 4 represents a vertical longitudinal section on or about line $a\,a$, Fig. 2, the draft-frame being omitted. Fig. 5 is a detached side elevation of one of the combined seed and fertilizer boxes and its mechanism, the carrying and drive wheel being omitted. Fig. 6 represents a top plan view of the seed and fertilizer box frame and mechanism, a horizontal section being taken through the vertical hub of the inverted horizontal bevel gear-wheel. Fig. 7 is a top plan view of the iron bed of one of the combined seed and fertilizer boxes, showing the fertilizer-distributer, the seed-slide, and a portion of the mechanism for operating the latter. Fig. 8 is an enlarged detached perspective view of the pivoted rocking head, in which the travel of the ratchet is regulated for operating the fertilizer-distributer. Fig. 9 is a horizontal section through the pivoted rocking head on or about line $b\,b$, Fig. 20. Fig. 10 is an enlarged detached perspective view of the sliding block, which travels within the slideway-groove of the pivoted rocking head. Fig. 11 is an enlarged vertical longitudinal section on or about line $c\,c$, Fig. 12. Fig. 12 is a top plan view of the drill-tube and a portion of its supporting-frame. Fig. 13 is an enlarged vertical section on or about line $d\,d$, Fig. 7, showing the construction of the ball-and-socket joint. Fig. 14 is a detached view of a portion of the lever which connects the pivoted rocking head with the bell-crank for operating the seed-slide. Fig. 15 is an enlarged side elevation of the pivoted rocking head, showing the crank and connecting-rod for operating it and portions of the connecting-rods for operating the seed and fertilizer mechanism. Fig. 16 represents a detached top plan view of the draft-frame. Fig. 17 represents a side elevation of the same. Fig. 18 represents a rear elevation of the same, showing the position of the seed and fertilizer box frames and the manner of securing them in place to the draft-frame. Fig. 19 is an enlarged vertical section on or about line $e\,e$, Fig. 18. Fig. 20 is a side elevation showing the pivoted rocking head and portions of its connecting-rods.

Referring to the construction of the machine in detail, 1 and 1ª represents the transverse bars forming a part of the draft-frame (see Figs. 16, 17, and 18) for these parts of the machine. They are preferably formed of angle-iron rigidly secured to the diverging end portions 2 of the reach 2ª by screws 3, which is also made of angle-iron, but other suitable material may be used. The draft-pole 4 is connected to the frame by bolts 3ª 3ᵇ. The front bar 1ª is provided with the usual strengthening-braces 5, secured to the transverse bar 1ª and to the draft-pole by bolts 3ᶜ.

On the frame-bars 1 and 1ª are secured by bolts 3ᵈ two rectangular frames 6 and 6ª, (see Figs. 2, 6, and 18,) upon which is mounted the combined seed and fertilizer boxes and their operating mechanism.

The supporting or driving wheels (of which there are two) 7 and 7ª, the one, 7, being rigidly secured to one end of the axle 8, and the other, 7ª, being secured in the same way to the opposite end of the axle 8ª, both of which axles are mounted in boxes 9, secured to the under side of the frame.

On the rectangular frames 6 and 6ª are mounted the supporting bed-pieces 10, firmly secured in place thereto by bolts 11. (See Fig. 7.) In each of these bed-pieces is placed and secured by bolts or in any well-known way a wooden hopper 12. Within the hoppers 12 is a partition 13, which separates the seed and fertilizer chambers. (See Fig. 4, where a section through this partition 13 is shown.) At the top of each hopper or box is secured by hinges 14 two covers 15 and 15$^a$, one for the fertilizer-chamber and one for the bean or seed box.

On each frame 6 and 6$^a$ is mounted in front of the seed and fertilizer hopper in boxes 16 a transverse shaft 16$^a$. On the inner ends of each shaft 16$^a$ is rigidly secured a crank-disk 17, (see Figs. 2, 4, 5, 6, and 15,) and near the opposite ends of said shafts is a small sprocket-wheel 18. (See Figs. 2 and 6.) On each axle 8 and 8$^a$ is mounted in a line with the wheels 18 a large sprocket-wheel 19, (see Figs. 1, 3, 5, and 6,) and the two sprocket-wheels are connected by a sprocket-chain 20. (Shown in Figs. 1, 5, 6, and others.) On the axle-shaft is a clutch 21 21$^a$. It is kept in engagement by means of a spring 22. (See Fig. 6.) The part 21 is prevented from turning on the shaft by means of a pin 23, which passes through a slot and is rigidly secured to the axle, substantially as shown in said Fig. 6. It is thrown out of engagement with the part 21$^a$ by means of the arm 24, pivoted to the machine by a bolt 25, the operation of which will appear in the description further of the means for raising and lowering the drill-tooth, fertilizer, and seed tubes.

A slideway portion 26 (see Fig. 8) is provided with a pivotal journal 27 and a longitudinal slideway 28. It is suspended by the pivotal journal 27 in a box 29. (See Fig. 6.) On one side of the slideway portion is a pair of pivotal ears 30, and on the opposite side is another pair of similar ears 31. (See Fig. 8.) Between the ears 31 is pivoted a connecting-rod 32, (see Figs. 5, 6, and 15,) having its opposite end pivoted to the crank-disk 17 by a pin 33.

Within the slideway 28, in the slideway portion 26, is a sliding block 34, adapted to fit the slideway and slide easily up or down therein. (See Figs. 9 and 10, also Figs. 5 and 6.) It is provided with a pivotal pin 35. Between the ears 30 on the vibratile slideway portion 26 is pivoted a connecting-rod 36. The opposite end of the rod 36 is pivoted by a ball-and-socket joint 36$^a$, substantially as shown in Figs. 13 and 14, to a bell-crank 37, pivotally secured by a pin 38 to the base-frame 10$^e$. (See Figs. 6 and 7.) The opposite end of the bell-crank arm is provided with a slotted portion 39, through which a pin 40 extends up from the seed-slide bar 41. (See Fig. 7, also Figs. 5 and 6.) The seed-slide is provided with an opening 41$^e$, which moves over an opening 41$^f$ to allow the seed to pass out from the box while operating.

Mounted in suitable and well-known bearings below each frame-piece 6 and 6$^a$ is a shaft 42. (See Figs. 5 and 6.) On the inner ends of each shaft 42 is rigidly secured a ratchet-wheel 43, one being shown in Figs. 5 and 6, but as the mechanism on the frame 6 is exactly the same as that on the frame 6$^a$, the only difference being that the mechanism is right-handed on one and left on the other, a description of one will answer for the other.

Outside of the ratchet-wheel 43 is secured to the end of the shaft 42 so as to turn thereon a crank-arm 44, having a ratchet-pawl 44$^a$, (see Fig. 5,) and on the opposite side of the ratchet-wheel is another crank-arm 45, also secured to the shaft 42, so as to turn thereon, and provided with a ratchet-pawl 45$^a$, both engaging with the wheel 43. To the pin 35 on the sliding block 34 is pivoted a connecting arm or rod 46, having an upwardly-curved end 47. (See Figs. 5, 15, and 20.) The opposite end of arm 46 is pivoted to the crank-arm 45 by a pin 48. (See Fig. 5.) On one side of the arm 46 is pivoted to the same pin 35 another arm 49, having its opposite end pivoted to the crank-arm 44 by a pin 50. (See Fig. 5.)

Pivoted to supports on the frame of the machine by pins 52 are two arms 53 and 53$^a$, one for each seed and fertilizer box. (See Fig. 5, where one is shown, and Fig. 2, where both are shown.) These arms 53 and 53$^a$ are provided with handle portions 54, by which they are operated. They are also provided with the usual bell-crank handle-pieces 55, pivoted thereto by pins 56, (see Figs. 1 and 2,) and with a sliding bolt provided with springs, each of which operate in connection with the usual curved racks 57, (see Figs. 1, 3, 4, and 5, where portions of these racks are shown,) fastened to some stationary point on the machine for the purpose of easily securing the said arms at any point to which they can be adjusted. The object of these arms 53 53$^a$ will appear farther on.

On the inner ends of each shaft 42 is mounted and rigidly secured a bevel gear-wheel 58, (see Figs. 4 and 6,) adapted to gear in with a horizontal bevel gear-wheel 59. The gear-wheel 59 is secured on a vertical shaft 60, mounted in a suitable bearing in the bed-pieces 10. (See the section Fig. 4, where this is more clearly shown.) At the top of each vertical shaft 60, within or at the upper side of the bed-pieces 10, is a toothed agitating-wheel 61, either attached to, as shown in Fig. 7, or formed in one integral piece with the shaft 60, as shown in Fig. 4, for stirring the fertilizing material and causing it to feed down through the fertilizer-tube 62. (Shown in Figs. 1 and 4.) This tube 62 is made in the usual way, of elastic material, and secured to the part 63 (shown in Figs. 4 and 5) in the well-known manner.

The seed-tube 64 is pivoted by pivots 65 in a frame 66. (See Figs. 6, 11, and 12.) It is kept in its proper position by means of a pin 67, located on an extension 67$^a$ at the front of the tube. (See Fig. 11.) It is made of wood or other equivalent material. The object of the pin 67 is to protect the seed-tube and its several parts in case an obstruction of any kind should be in its way. The pin is strong enough to hold the tube in its proper position for practical use; but if a stone or other obstruction should be in the way and present sufficient force to break the tube while in operation the pin 67, being of wood and consequently the weakest, would break first and allow the tube to swing back out of the way and pass over the obstruction without injury.

The drill-tooth 68 for cutting the furrow in which the seed and fertilizer are dropped is made in the usual way. At the rear of each drill-tooth are secured vertically-adjustable supports 69, to which two inclined covering-plates 70 and 71 are secured. (See Figs. 1, 3, and 4.)

The frames 66, carrying the seed and fertilizer tubes and their several attachments, extend forward, inclining outward each way, as shown at 66ᵉ in Fig. 2, and terminate in ends which are pivoted at or about the points 72. (Shown in Fig. 2.)

At the rear the frame-pieces 66 are each provided with a cross-bar 73, securely bolted thereto, as shown in Fig. 6. In the center of each of these cross-bars is secured by bolts 74 (see Figs. 1 and 6) a chain 75. These chains are shown in Figs. 1, 3, 4, and 5. At the rear end of each base-frame 6 and 6ᵃ are secured, by bolts 76, two rearward extension-pieces 77, (see Fig. 6,) carrying boxes at their ends, in which are mounted crank-shafts 78, each having double cranks 79. (See Figs. 1, 3, and 4.) These cranks are located so as to come at or about the center of boxes or hoppers 12. (See Fig. 3.) The chains 75 are connected to the cranks by means of a box-piece 80. (See Figs. 3 and 4, where this is shown.) These crank-shafts are each provided at their outer ends next to the wheels with a short crank-arm 81. (See Figs. 1, 2, 3, and 6.) The ends of the shafts 78 between the two seed and fertilizer boxes are each provided with an operating crank-arm 82. (See Figs. 2, 3, and 5.) Their handles 83 (see Figs. 2 and 5, particularly Fig. 2) extend near enough to each other so so they can both be operated at once or one alone, as may be required.

The office of the cranks 82 is to provide the means for raising or lowering the pivoted frames 66, carrying the seeding-tubes and their attachments, which are raised or lowered at the same time. The object of the short cranks 81 is to provide a suitable means for throwing the clutches 21 into or out of engagement with the parts 21ᵃ, and thus stop or start the operating mechanism. This is done every time the drill-teeth are lowered, which operation causes the crank or cranks 81 to turn downward away from the arm 24, so as to release it. The springs 22 then are free to act and throw the clutches into engagement, and when the cranks 81 are turned up they come in contact with the arms 24 and move them against the force of the springs 22, and therefore throw the clutches out of engagement, as shown in Fig. 6.

Pivoted to the ends of each arm 53 and 53ᵃ, (shown in Figs. 1 and 2,) by a pin 84, (see also Fig. 5,) is an arm 85, (see Figs. 15 and 20,) which connects at its lower end by a pin 86 with the curved end 47 of the arm 46, the office of which is to provide a suitable means for raising and lowering the pin 35 and its arms 46 and 49, and thereby graduating the feed of the fertilizing material or shutting it off entirely. It will be readily seen that if the pivotal center 35 be raised up to a point even with the center 27, upon which the slideway portion 26 swings, no reciprocating motion whatever will be given to the arms 46 and 49, and consequently no motion will then be given to the fertilizer-agitating wheel 61, and that as the pivotal center 35 is lowered below the pivotal center 27 the motion given to the stirring-wheel 61 will be proportionally increased.

The operation of the machine is as follows: The seed and fertilizer chambers being charged and the crank-handles 83 being let down, thereby lowering the drill-tooth and its coacting parts, which operation throws the clutch into gear, as hereinbefore described, and the machine started, (being drawn by horses in the well-known way,) the drive-wheels rotate in the direction of the arrow V, (see Fig. 1,) and through the sprocket-wheels 18 and 19 motion is transmitted to the crank-disk 17, thereby operating the arm 32, the swinging slideway portion 26, and through it reciprocating motion is transmitted to the arms 46 and 49, thereby operating the ratchet-wheel 43 and the gearing for operating the fertilizer-stirring wheel 61. At the same time the swinging slideway portion 26, through its arm 36 and bell-crank 37, motion is given to the seed-slide, so as to open and close the opening 41, thereby allowing the seed to drop through to the ground at short intervals.

The feeding of the fertilizer can be adjusted or stopped entirely, as hereinbefore stated, by means of the adjusting-arms 53 or 53ᵃ.

When it is desired to instantly stop the machine, all that is required is to turn up the crank-handle 83 into the position shown in Figs. 3 or 5. This operation, by throwing the clutch out of gear, stops the action of all the operating parts, and the machine can be drawn along without operating either the fertilizer mechanism, the seed-dropping mechanism, or the seeding-tube.

I claim as my invention—

1. In a seed-planter, the combination with the supporting-frame and drive-wheels, of a pivoted vibratile slideway-frame, mechanism connecting it with the driving-axle for giving it a reciprocating swinging movement, a movable block mounted in said slideway and provided with a pivotal pin carrying two connecting-rods having their opposite ends pivoted to arms secured loosely on a shaft mounted in boxes in the frame of the machine and carrying a ratchet-wheel rigidly secured to it, pivoted pawls on said arms in engagement with the ratchet-wheel, means connecting the ratchet-wheel with the fertilizer-stirring wheel, and means for moving the movable block and its pin carrying the ends of the two connecting-rods toward or from the pivotal center of the vibratile slideway-frame and thereby adjusting the feed of the fertilizer material substantially as described.

2. In a seed-planter, the combination with the supporting-frame and drive-wheels, of a pivoted vibratile slideway-frame, mechanism connected by sprocket-gearing with the driving-axle for giving it an invariable reciprocating swinging movement on its pivotal center, a movable block mounted so as to slide easily in the slideway to or from the pivotal center of the vibratile slideway-frame, a pivotal pin rigidly secured to the movable block, means pivotally connecting said pin with a ratchet-wheel mechanism mounted on a shaft connected by bevel-gearing with and for rotating the fertilizer-distributing mechanism, and means for moving the movable block to or from the pivotal center of the vibratile slideway-frame and thereby varying the motion of the fertilizer-distributing mechanism or stopping it, as hereinbefore set forth.

3. In a seed-planter, the combination with the supporting-frame and drive-wheels, of a pivoted vibratile slideway-frame, means connecting by sprocket-gearing with the driving-axle for giving it a reciprocating swinging motion, a connecting-rod pivotally connecting with the vibratile slideway-frame at one end and with a bell-crank at the opposite end, and a seed-slide bar having an opening through it adapted to be moved over an opening through which the seed drops, pivotally connected with the opposite end of the bell-crank, for operating the seed-slide, substantially as described.

4. In a seed-planter, the combination with the supporting-frame and drive-wheels, of a pivoted vibratile slideway-frame, means connecting it with the driving-axle for giving it a reciprocating swinging movement, a movable block mounted in said slideway-frame and provided with a pivotal pin carrying two connecting-rods having their opposite ends pivoted to arms connected loosely so as to turn on a shaft mounted in boxes in the frame of the machine, and a ratchet-wheel rigidly secured to said shaft, pivoted pawls on said arms in engagement with the ratchet-wheel, means connecting the ratchet-wheel with the fertilizer-stirring wheel, and a connecting-rod connecting with the seed-slide and with the vibratile slideway-frame, for operating the seed and fertilizer mechanism, substantially as described.

ETHAN S. BENHAM.

Witnesses:
E. B. EVEINGHAM,
CHAS. E. KETCHUM.